(12) United States Patent
Liou

(10) Patent No.: US 7,501,055 B2
(45) Date of Patent: Mar. 10, 2009

(54) OZONE ON-LINE INJECTION, REUSE, AND DESTRUCTION SYSTEM

(76) Inventor: Huei-Tarng Liou, 3F., No. 6, Alley 20, Lane 85, Changsing St., Da-an District, Taipei City 106 (TW)

( * ) Notice: Subject to any disclaimer, the term of this patent is extended or adjusted under 35 U.S.C. 154(b) by 455 days.

(21) Appl. No.: 11/206,575

(22) Filed: Aug. 18, 2005

(65) Prior Publication Data

US 2006/0037899 A1    Feb. 23, 2006

(30) Foreign Application Priority Data

Aug. 20, 2004    (TW) .............................. 93125221 A

(51) Int. Cl.
  *B01D 21/30*    (2006.01)
  *B01D 19/00*    (2006.01)
  *C02F 1/20*    (2006.01)

(52) U.S. Cl. .................... 210/136; 210/198.1; 210/205; 210/258; 210/760; 210/188; 210/209; 422/31

(58) Field of Classification Search ................ 210/188, 210/198.1, 205, 150, 209, 750, 760, 711, 210/765, 220, 248, 207, 519, 258; 137/115.01, 137/312; 261/74, 76, 79.1; 422/31, 30, 32; 96/155, 239, 396

See application file for complete search history.

(56) References Cited

U.S. PATENT DOCUMENTS

| | | | | |
|---|---|---|---|---|
| 3,989,461 A | * | 11/1976 | Skocypec et al. | ........... 422/111 |
| 4,160,727 A | * | 7/1979 | Harris, Jr. | .................... 210/248 |
| 6,106,731 A | * | 8/2000 | Hayes | ......................... 210/760 |
| 6,488,271 B1 | * | 12/2002 | Nelson et al. | ............... 210/760 |

* cited by examiner

*Primary Examiner*—Duane S Smith
*Assistant Examiner*—Lucas Stelling
(74) *Attorney, Agent, or Firm*—Ladas & Parry LLP

(57) ABSTRACT

The invention relates to an ozone on-line injection, reuse and destruction system, which draws liquid to be mixed with ozone through a pump. The system mainly comprises a gas-liquid separation device and an ozone destruction device. When mixed with the drawn liquid, some of the ozone may dissolve in the liquid and the undissolved portion is recovered and reused, while the ozone, oxygen and nitrogen that cannot be reused are introduced into an ozone destruction device. The ozone destruction device contains an ozone destruction medium so that it can decompose ozone into oxygen that can escape into the environment along with the undissolved oxygen and nitrogen, thereby avoiding environmental pollution caused by the direct release of ozone.

8 Claims, 2 Drawing Sheets

OZONE ON-LINE INJECTION, REUSE, AND DESTRUCTION SYSTEM

BACKGROUND OF THE INVENTION

1. Field of the Invention

The invention relates to a device for dissolving ozone in liquid (particular water), characterized in that it can inject, reuse and destruct ozone on-line.

2. Description of the Prior Art

Generally, ozone is industrially produced from air or oxygen through electrical discharge. Since ozone is regarded as a harmful gas, its allowable amount in the atmosphere should be no more than 0.1 ppm for 8 hours. In the process of generating ozone, ozone gas is injected into a liquid via an injector to be dissolved in the liquid. If the ozone is not completely dissolved in the liquid, its undissolved portion will escape into the atmosphere along with other low solubility gases, such as oxygen and nitrogen. The escaping ozone is not only a waste for the manufacturing process, but is also detrimental to the environmental ecology. However, the state of the art of utilizing ozone is not well established for the post-use disposal.

SUMMARY OF THE INVENTION

The invention relates to a system for dissolving a gas (particularly ozone) in a liquid (particularly water), characterized by the on-line injection, reuse, and destruction of ozone. The system draws water through a pump to mix with ozone. It mainly comprises a device for introducing gas (hereafter sometimes called a leakage check valve device), an injector, a gas-liquid separation device, and an ozone destruction device. In the system, ozone is first introduced into the leakage check valve device, and then sucked into the injector to mix with the water therein drawn by the pump. Some of the ozone may dissolve in the water, and the undissolved portion will be recovered and reused, whereas the portion of ozone, oxygen and nitrogen that cannot be reused is introduced into an ozone destruction device. The ozone destruction device contains an ozone destruction medium (e.g., manganese dioxide) that can decompose ozone into oxygen before being discharged into environment along with the undissolved oxygen and nitrogen, thereby preventing ozone from being directly released into the environment.

DETAILED DESCRIPTION

Figure 1:
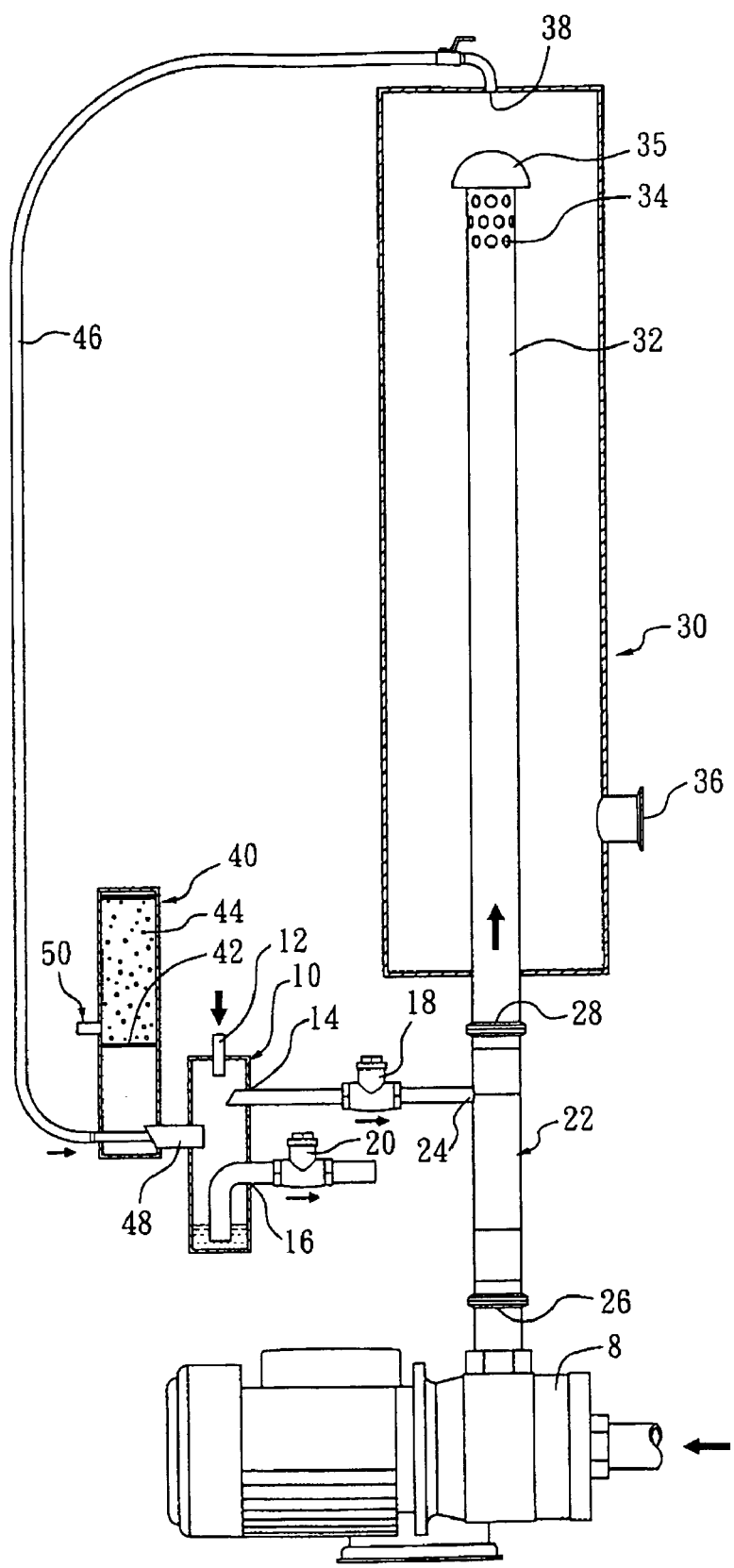
FIG. 1 shows the allocation plan of the system according to the invention.

The invention relates to a system that can inject, reuse and destruct ozone on-line. Its allocation plan is shown in FIG. 1. The system mainly comprises a leakage check valve device 10, two sets of check valves 18, 20, an injector 22, a gas-liquid separation device 30, and an ozone destruction device 40.

The leakage check valve device 10 is substantially a container with a gas inlet 12 on its top, whereby the gas to be dissolved, e.g., ozone, is introduced into the system. As shown in FIG. 1, there are two outlets on the right side of the container, referred to as the upper outlet 14 and the lower outlet 16 according to their respective locations to which the first and second check valves 18, 20 are connected, respectively. The first check valve 18 is connected to a gas inlet 24 of the injector 22, and the outlet of the second check valve 20 is used as a draining end.

The injector 22 has an inlet 26 and an outlet 28. The inlet 26 is connected to a pump 8, while the outlet 28 is connected to the gas-liquid separation device 30. The injector 22 possesses a negative-pressured suction structure, which may apply Venturi's tube effect, so that gases may be sucked into the injector 22 through the gas inlet 24.

A conduit 32 is provided inside the gas-liquid separation device 30, with its lower end connected to the outlet 28 of the injector 22 and the upper end extending to near the top of the gas-liquid separation device 30. Furthermore, evenly distributed pores 34 are formed near the open end of the conduit 32 and a domelike end cap 35 may be disposed at the open end. An outlet 36 is arranged near the bottom of the gas-liquid separation device 30 and a gas outlet 38 is arranged on the top of the same.

Figure 2:
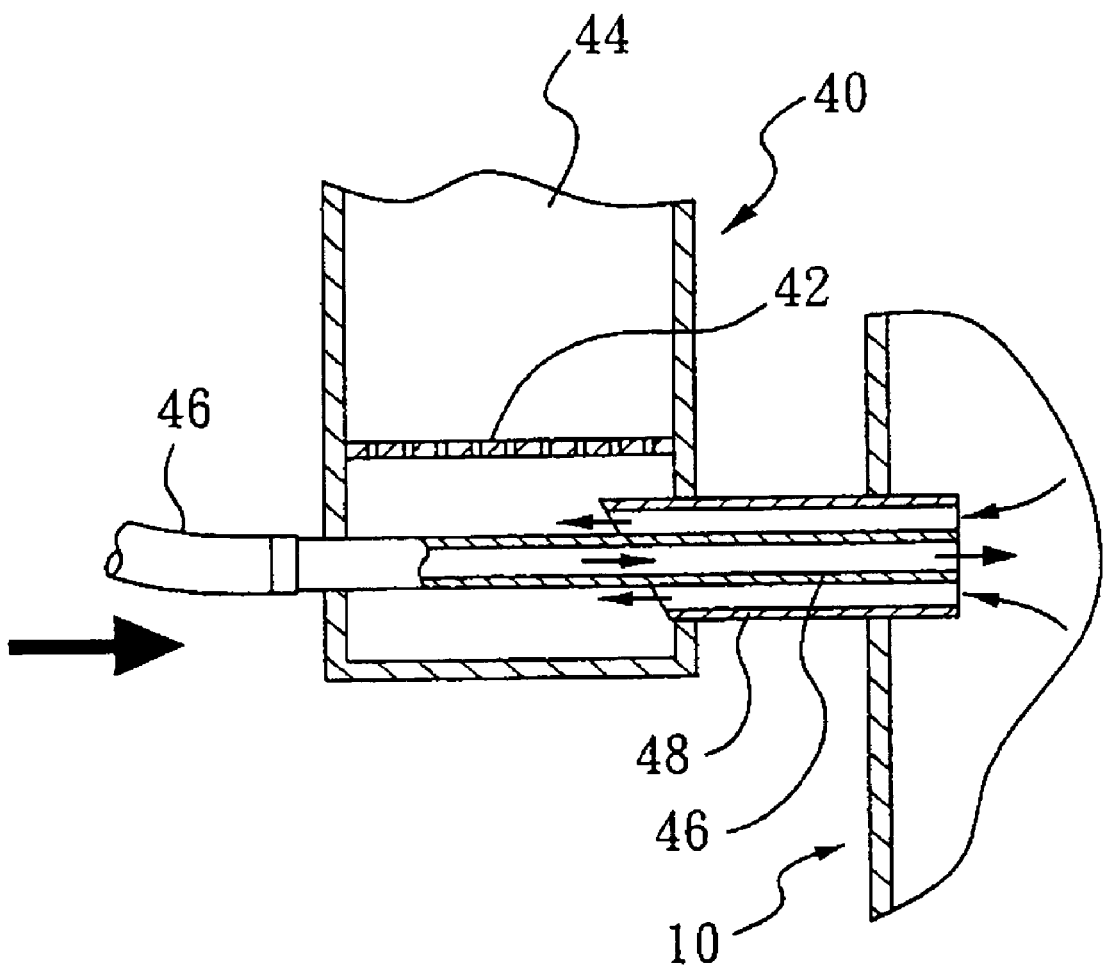
FIG. 2 is a schematic enlarged cross-section view of the coaxial inner and outer pipes for connecting the ozone destruction device and the leakage check valve device.

The interior of the ozone destruction device 40 is divided into an upper section and a lower section by a screen layer 42. The top of the upper section is in air communication with the surroundings. The upper section is provided with an ozone destruction medium 44. A gas pipe 46 is connected to the gas outlet 38 of the gas-liquid separation device 30, passing through the section underlying the ozone destruction medium 44 and extending into the interior of the leakage check valve device 10. The ozone destruction device 40 is connected with the leakage check valve device 10 via an outer pipe 48 coaxial with the pipe 46. FIG. 2 shows a detailed cross-section view of the coaxial pipes 46, 48 connecting the ozone destruction device 40 and the leakage check valve device 10.

According to the invention, during the process of dissolving the ozone in the liquid, the pump 8 draws the liquid (or water) into the injector 22 continuously, while the ozone to be dissolved in the liquid enters the leakage check valve device 10 through the gas inlet 12. Due to the effect of negative-pressured suction of the injector 22, the gas entering the leakage check valve device 10 is sucked into the injector 22 via the first check valve 18 to mix with the water therein and produce a gas-liquid mixture.

The gas-liquid mixture is drawn into the conduit 32 of the gas-liquid separation device 30, and is sprayed onto the inner wall of the gas-liquid separation device 30 through the pores 34 distributed under the end cap 35 when it reaches the domelike end cap 35 at the top of the conduit 32. The undissolved gas is separated from the water, and forms gas partial pressure. In addition to facilitating dissolving the gas in the liquid, the partial pressure at the lower outlet 36 of the gas-liquid separation device 30 also facilitates the liquid with dissolved ozone to flow out of the outlet 36.

The undissolved gas may enter the leakage check valve device 10 from the gas outlet 38 through the pipe 46. Most of the gas entering the leakage check valve device 10 through the pipe 46 can be reused, that is, it can again be sucked into the injector 22 through the first check valve 18. The gas entering the leakage check valve device 10 contains a small amount of moisture, which may condense and collect at the bottom of the leakage check valve device 10 to form a liquid surface. When the condensed moisture continues to collect and reaches a certain liquid level, it can be drained out from the second check valve 20 via an elbow pipe 17.

On the other hand, a small portion of the gas entering the leakage check valve device 10 through the gas pipe 46 may not be reused. This small portion of gas will enter the ozone destruction device 40 through the outer pipe 48 (see FIG. 2).

Ozone gas is decomposed into oxygen and released to the environment from the top of the ozone destruction device 40 when it passes through the ozone destruction medium in the upper section of the ozone destruction device 40.

Preferably, manganese dioxide is selected as the ozone destruction medium in the ozone destruction device 40. To enhance the reaction efficiency of the ozone destruction medium, a heating unit 50 may be installed on the ozone destruction device 40. The heating unit 50 can further improve reaction efficiency of the ozone destruction medium due to its function of removing water vapor.

While the technical content of the present invention has been described in detail with reference to the above-mentioned embodiment, this embodiment illustrates a preferred embodiment aspect of the invention only by way of example and is not intended to limit the scope of the invention. Any modifications or changes to the invention that can be easily achieved by those skilled in the art shall be included within the scope of the claims claimed by the application, since they are not all the necessary technical conditions of the invention as described in the above example.

What is claimed is:

1. An on-line injection, reuse and destruction system for gas, comprising:
   a gas-introducing device for introducing at least one gas comprising an inlet for injection of at least part of the gas and a check valve for draining liquid;
   a first check valve connected to the gas-introducing device;
   an injector connected to the first check valve for drawing the gas through the first check valve and mixing the gas with a liquid;
   a gas-liquid separation device connected to the injector for separating liquid from the mixed gas and liquid from the injector; and
   an ozone destruction device connecting the gas-liquid separation device and the gas-introducing device for supplying at least part of the gas to the gas-introducing device and destroying at least part of ozone of the gas, wherein
   the gas is ozone and the liquid is water,
   the gas-introducing device comprises an upper outlet connected to the first check valve; the injector having an gas inlet for connecting to the first check valve; the gas-liquid separation device having a conduit installed therein, with the lower end of the conduit connected to the outlet of the injector while the upper end thereof extends to near the top inside the gas-liquid separation device; a water outlet arranged near a bottom of the gas-liquid separation device and a gas outlet arranged near the top of the gas-liquid separation device, and
   the ozone destruction device with its interior is divided into an upper section and a lower section in a gas communication manner, and the top of the upper section is in air communication with the surroundings and the upper section is provided with an ozone destruction medium, and the pipe is connected to the gas outlet of the gas-liquid separation device, passing through the lower section of the ozone destruction device and entering the leakage check valve device; and
   an outer pipe is arranged so that it is coaxial with the part of the pipe that connects the ozone destruction device and the gas-introducing device.

2. The system of claim 1, further comprising a pump connected to the inlet of the injector, whereby water is pumped into the injector.

3. The system of claim 2, wherein an elbow pipe has one end connected to the check valve and an opposite end extending to near a bottom of the gas-introducing device.

4. The system of claim 1, wherein the injector is a device for drawing gases by means of the Venturi's tube effect.

5. The system of claim 2, wherein an end cap is disposed on the upper end of the conduit inside the gas-liquid separation device, and evenly distributed pores are formed near the upper end of the conduit.

6. The system of claim 2, wherein the ozone destruction device comprises a screen layer to divide the device into the upper and lower sections.

7. The system of claim 1, wherein the ozone destruction medium is manganese dioxide.

8. The system of claim 6, wherein an additional heating unit is installed in the upper section of the ozone destruction device.

* * * * *